Dec. 17, 1940.   R. W. BURNETT   2,225,427
HAND BRAKE
Filed June 20, 1936   4 Sheets-Sheet 3

INVENTOR
Richard W. Burnett
BY
Blair, Curtis + Dunne
ATTORNEYS

Dec. 17, 1940.   R. W. BURNETT   2,225,427
HAND BRAKE
Filed June 20, 1936   4 Sheets-Sheet 4
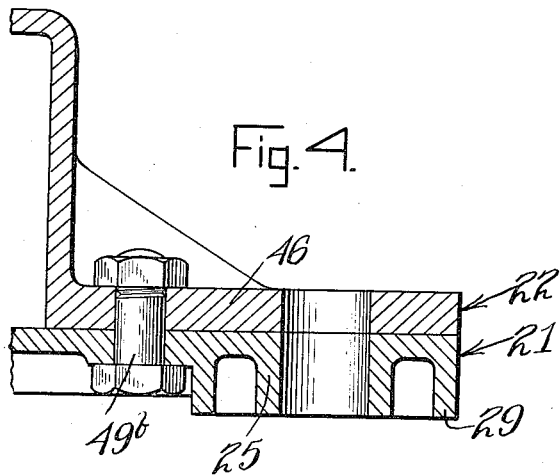
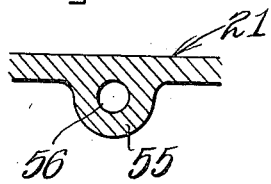
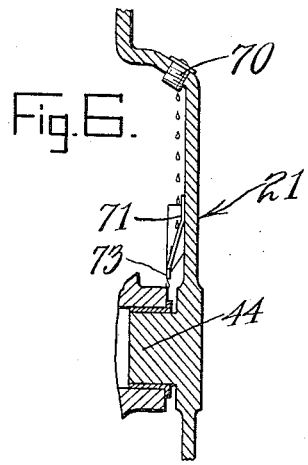
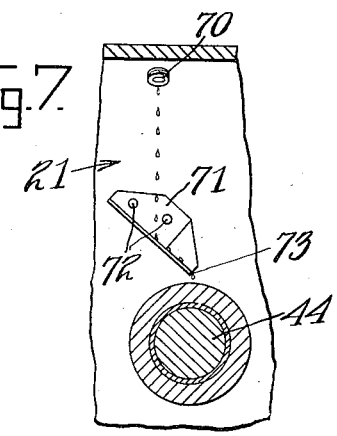
INVENTOR
*Richard W. Burnett*
BY
*Blair, Curtis & Dunne*
ATTORNEYS Patented Dec. 17, 1940

2,225,427

UNITED STATES PATENT OFFICE 2,225,427

HAND BRAKE

Richard W. Burnett, Chicago, Ill.

Application June 20, 1936, Serial No. 86,235

11 Claims. (Cl. 74—505)

This invention relates to hand brake mechanism for railway cars.

One of the objects of this invention is to provide a simple, inexpensive and practical housing that will be well adapted to meet the varying conditions of practical use. Another object is to provide durable apparatus of the above character which will be reliable in operation. Another object is to provide a housing of the above character within which the brake mechanism may be easily assembled and mounted in position. Another object is to provide a brake of the above character which is small and light and yet strong and rigid. Another object is to provide a brake of the above character which will be light in weight and yet firmly and efficiently support the moving parts. Another object is to provide means in a brake of the above character for efficiently lubricating bearings in all positions. Other objects will be in part obvious and in part pointed out hereinafter.

This invention accordingly consists in features of construction, combinations of elements, and arrangements of parts as will be exemplified in the structure to be hereinafter described and the scope of the application of which will be indicated in the following claims.

In the accompanying drawings, in which is shown one of the various possible embodiments of my invention, Figure 1 is a front plan view of the housing;

Figure 4 is a horizontal sectional view of a portion of the housing taken along lines 4—4 of Figure 1;

Figure 5 is a sectional view of a portion of the housing taken along the line 5—5 of Figure 2;

Figure 6 is a side plan view of a modification mounted upon a portion of the vertical sectional view shown in Figure 3; and, Figure 7 is a rear plan view of the modification shown in Figure 6.

Similar reference characters refer to similar parts throughout the several views of the drawings.

Figure 3:
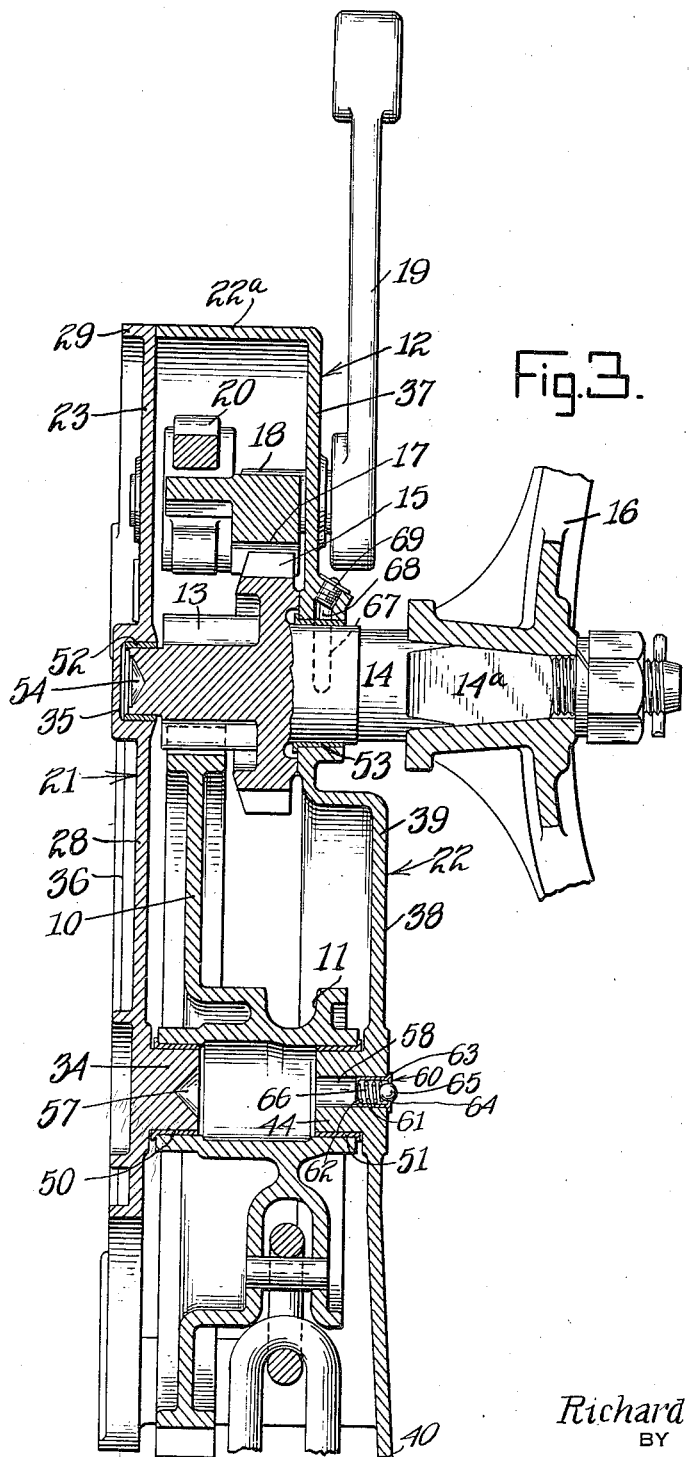
Figure 3 is a vertical sectional view of the housing taken along lines 3—3 of Figure 1.

Referring first to Figure 3 of the drawings, the winding mechanism disclosed therein is preferably the same as that disclosed in co-pending application, Serial Number 91,059, filed July 17, 1936. In the lower part of the housing there is a winding drum 11 having a large gear 10 formed integral therewith. The winding drum and large gear are rotatably mounted within the housing generally indicated at 12, upon means to be hereinafter described. Positioned above gear 10 and winding drum 11, and riding upon bearings formed within the housing, is a shaft 14. A pinion gear 13 and a ratchet wheel 15 are preferably formed integral with shaft 14, pinion gear 13 meshing with gear 10. Removably secured to the squared end 14a of shaft 14 is a hand wheel 16 which, when manually rotated, rotates winding drum 11 through gears 13 and 10. Positioned above ratchet wheel 15 and adapted to engage therewith is a pawl 17 mounted upon a shaft (not shown). On a second shaft 18 is a lever 19 which is adapted to operate cam 20 for engaging and disengaging pawl 17 with ratchet wheel 15.

Still referring to Figure 3, the housing consists of a back plate generally indicated at 21 and a dished front plate generally indicated at 22. The back plate is preferably cast and comprises a top portion generally indicated at 23 (Figure 2), a pair of arms generally indicated at 24 and 25, and a pair of legs generally indicated at 26 and 27. The width of the central portion 28 of the back plate is preferably substantially narrower than the full width of the lower portion of the housing, as may be seen in Figure 1. Legs 26 and 27 are preferably substantially equal to the width of central portion 28. Extending around and rearwardly from the outer edge of back plate 21, I have formed a rib 29, (Figures 2 and 3). Thus it may be seen that I have materially reduced the size of the back plate, thus reducing its weight, while at the same time I have strengthened the construction by using ribs 29 so that the back plate is well adapted to carry the various strains placed thereupon while in use.

Through the ends of arms 24 and 25 and legs 26 and 27 extend a series of holes 30a, 30b, 30c and 30d, and 31a, 31b, 31c and 31d, and in the top portion 23 of the plate I have formed two bearings 32 and 33 for purposes to be disclosed more fully hereinafter. Referring now to Figure 3, at a point in the lower part of central portion 28 is an inwardly extending lug or projection 34 and at the upper end of central portion 28 is a journal 35, also for purposes to be disclosed more fully hereinafter. About the peripheries of holes 30a, 30b, 30c and 30d, and 31a, 31b, 31c and 31d, bearings 32 and 33 and the base of lug 34 are a plurality of ribs, as may be seen in Figures 2 and 3. These ribs preferably extend rearwardly a distance substantially equal to the distance which rib 29 extends rearwardly. A rib 36 preferably connects journal 35 and the rib extending rearwardly around lug 34. Thus, it may be seen that the various portions of the back plate in which I have formed holes, and at other places subject to strains, I have materially strengthened the construction without materially adding to its weight. These ribs together with the rib 29 all have been so designed that the portions of the housing absorbing the greatest shock are well adapted to meet the strains placed upon them.

Figure 1:
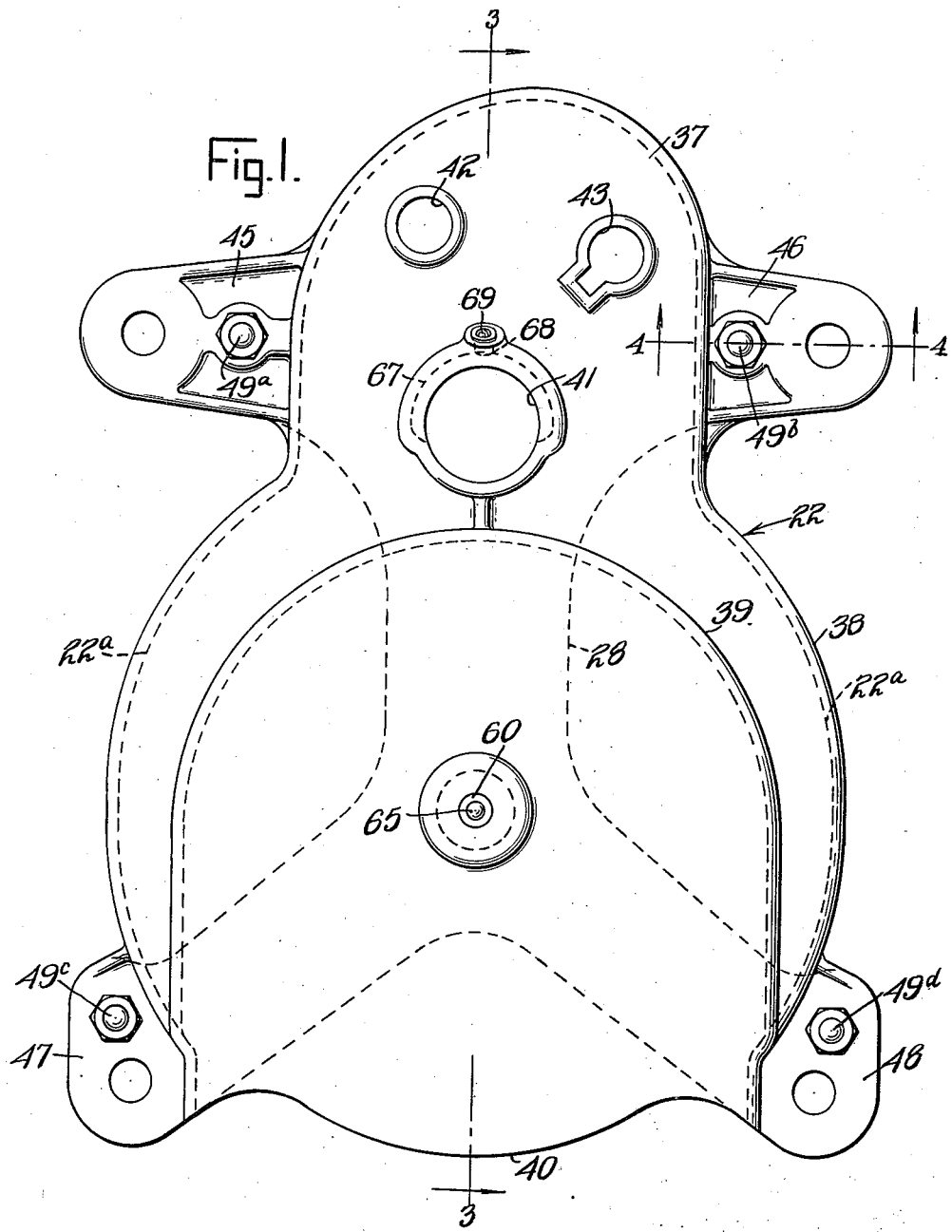
Figure 2:
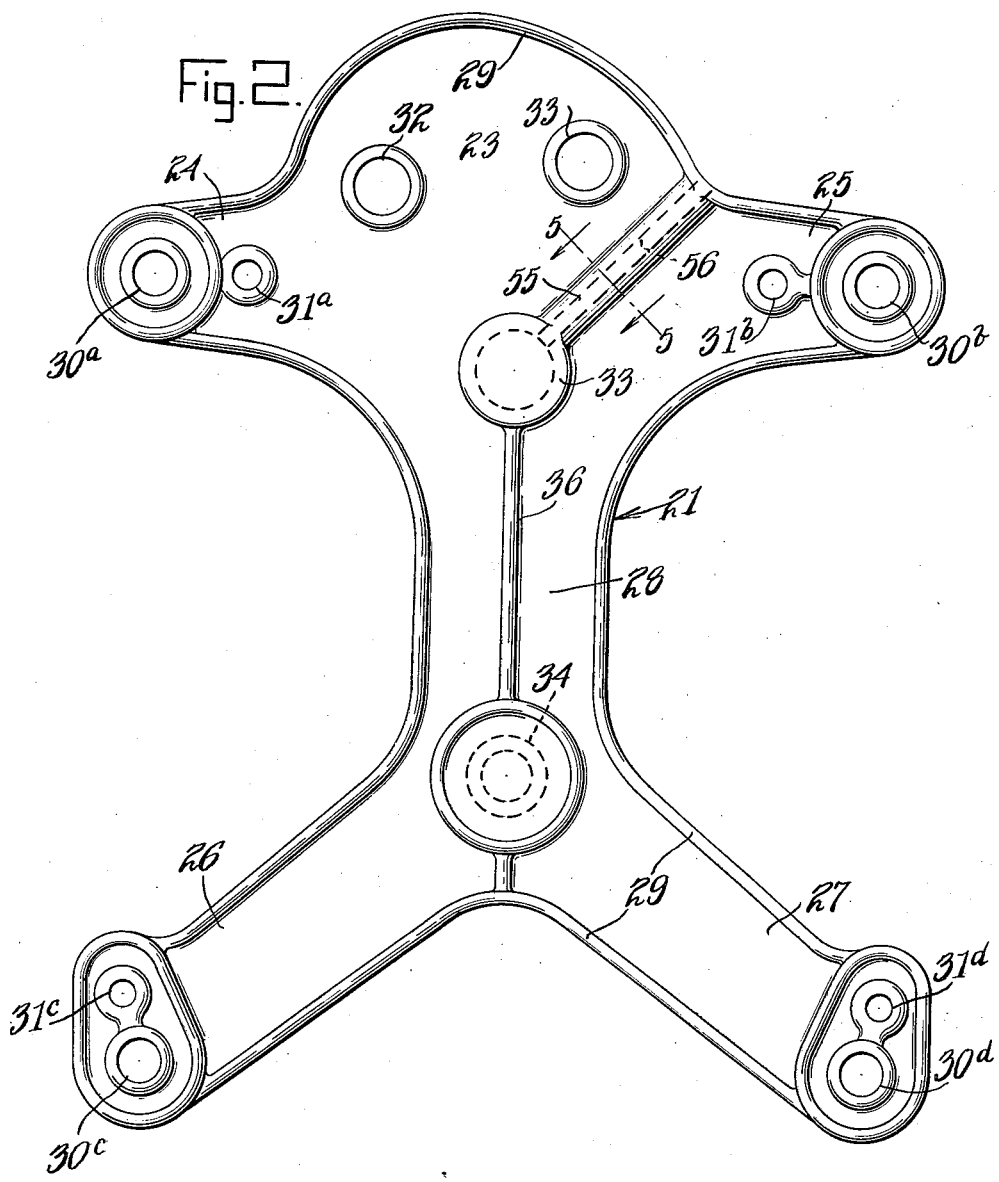
Figure 2 is a rear plan view of the back plate of the housing.

Referring now to Figures 1 and 3, front plate 22 comprises top and bottom portions 37 and 38 having flanges 22a extending rearwardly therefrom on all sides except at the bottom. The top portion 37 is sufficiently large to enclose the pawl, pinion gear, ratchet wheel and cam of the brake winding and releasing mechanism, and the bottom portion 38 encloses the gear 10 and drum 11. In the bottom portion there is a section 39 (Figures 1 and 3) which is dished outwardly, the lower edge 40 of which is preferably flanged outwardly to allow more clearance for the chain which winds on drum 11 within the housing.

In the top portion 37 of the front plate are three bearing holes 41, 42 and 43, and preferably centrally positioned in dished section 39, integral therewith and extending inwardly therefrom is a machined lug or projection 44 (Figure 3). Extending outwardly from flange 22a, and positioned adjacent the rear edges thereof, are a pair of arms 45 and 46 and a pair of legs 47 and 48 (Figure 1).

When front plate 22 is superimposed on back plate 21, arms 24 and 25 lie beneath arms 45 and 46 and the ends of legs 26 and 27 lie beneath legs 47 and 48. The housing is held in this assembled relation by means of bolts 49a, 49b, 49c and 49d, which pass through holes 31a, 31b, 31c and 31d (Figures 1 and 2) and through holes in the legs and arms of front plate 22, which are in alignment therewith. Machined lugs 34 and 44 which have been so positioned upon the front and back plates that they are in alignment with each other when the plates are in assembled relation, form supports upon which integral drum 11 and gear 10 ride. Preferably between the lugs and the bores in the drum and gear are a pair of bushings 50 and 51. Thus, I have provided a mounting for the drum which is very sturdy and well adapted to meet the varying conditions of use. Furthermore, assembly of the mechanism within the housing is greatly simplified and the number of parts has been reduced. All of these advantages are material and together result in a more practical mounting for the winding drum in a hand brake.

Shaft 14 rides on the bushings which are mounted in journal 35 and bearing 41. The ribbed construction of the rear plate permits journal 35 to extend rearwardly (Figure 3). This allows pinion 13, which is integral with shaft 14 to be positioned adjacent the back plate and reduces the size of the top portion of the housing. The shaft 18 which carries cam 20 and lever 19 is mounted in bearings 32 and 43 (Figures 1 and 2) and the shaft of pawl 17 is mounted in bearings 33 and 42. Thus I have provided an efficient and sturdy method of mounting the shaft of the pinion and hand wheel, which results in further reducing the weight of the housing through reduction of its size.

Referring to Figure 1, the top portion 23 of the back plate is solid and of sufficient size so that when assembled with the front plate, the plates together with flange 22a enclose the cam, pawl, pinion and ratchet wheel. This prevents the weather from acting directly upon the smaller parts of the mechanism. Thus dirt, ice and other deteriorating and clogging substances may not act upon these parts of the mechanism.

Although, for certain features of the invention, any desired oiling and greasing systems may be used, I prefer to use the following system. On the inner end of shaft 14 (Figure 3) is a grease pocket 54. This is in open communication with the rear wall of journal 35. Referring to Figure 2, a greasing tube 55 is positioned upon the rear plate and is preferably formed integral therewith. This tube has a duct 56 (Figures 2 and 5) which is in communication with the grease pocket 54 formed in the end of shaft 14. Thus the ribbed construction of the back plate permits the formation of the greasing tube through which the rear end of shaft 14 may be greased.

In lug 34 (Figure 3) is a pocket 57 adapted to lighten the casting. The central portion 80 of the bore extending through the gear and drum holds a supply of grease and may be filled before the assembly of the brake unit. For replenishing the supply, a hole 58 has been drilled through lug 44. To retain the grease within this last-mentioned system I have provided a retainer generally indicated at 60 (Figure 3). This retainer preferably consists of a casing 61 having an inwardly extending flange 62 formed on its inner end and outwardly and inwardly extending flanges 63 and 64 on its outer end. A ball 65 is positioned within the interior of casing and is larger than the hole in the outer end thereof. Ball 65 is held over this hole against flange 64 by means of a conical spring 66, one end of which rests against flange 62 and the other against ball 65. Casing 60 is preferably of sufficient size to fit tightly within bore 58. However, it may be removed therefrom. Thus I have provided a removable retainer to fit in the end of an oil duct. This retainer may be removed to clean the greasing system and may be used in any lubricating duct in any part of the mechanism.

Extending partially around bearing 41 and opening thereon is a lubrication duct 67 (Figure 1). This is preferably connected to a duct 68 carrying a grease retainer 69 (Figure 3), which is similar to retainer 60. This system provides an efficient method of conveying grease to bearing 41.

Referring now to Figures 6 and 7, I have shown a system for oiling bearings positioned internally of a housing. An inlet 70 is positioned above a bearing such as lug 44. This inlet is so constructed that oil drops therefrom as shown in Figures 6 and 7. Positioned below inlet 70 is a deflector 71 which is preferably formed of sheet metal and has a channel formed therein. This deflector may be secured to the front plate by any suitable means such as by rivets 72 and has its lower end 73 positioned directly above the bearing. In operation oil enters the inlet and drops upon the deflector plate, which directs it upon the bearing.

Thus it may be seen that oil may be directed to any particular spot within the casing by means of this inlet and deflector plate. This construction makes it possible to oil bearings which are positioned within the casing and which would otherwise be inaccessible.

Thus I have provided a housing which is very light in construction, while at the same time it is well adapted to meet the varying strains and shocks of use. Furthermore, the smaller mechanical parts of the winding mechanism are thoroughly protected from the deteriorating and clogging effects of the elements. A system of mounting the winding drum and pinion has been disclosed which permits ease and speed in assembly, and at the same time provides strong and sturdy mountings for these parts. I have further disclosed lubricating systems whereby all parts of the construction may be easily either oiled or greased, and have provided a retainer for oil ducts which is removable, permitting the ducts to be easily cleaned.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a hand brake, in combination, a back plate, a front plate, winding means including a hollow shaft gearing and releasing mechanism positioned between said front and back plates, the lower portion of said front plate extending outwardly adjacent said winding means, and a pair of solid projections, one being formed upon said back plate and the other on the outwardly extending portion of said front plate, said projections being adapted to form means to journal said hollow shaft of said winding means.

2. In a hand brake, in combination, a back plate, a front plate, winding means and a pinion gear positioned between said front and said back plates, a plurality of ribs formed upon said back plate and extending rearwardly thereof, and a journal having a closed end for said pinion formed upon said back plate, integral therewith, and extending rearwardly thereof to a plane substantially coincident with the plane defined by the rear edges of said ribs.

3. In a hand brake, in combination, a back plate, a front plate, winding means including a hollow shaft disposed between said front and back plates, a hand wheel, gearing operatively connecting said hand wheel and said winding means, said winding means and said gearing being positioned between said front and said back plates, and a pair of aligned projections formed upon said front and back plates, said projections forming means extending into said hollow shaft to journal said hollow shaft of said winding means.

4. In a hand brake, in combination, a back plate, a front plate, winding means disposed between said front and back plates, a hand wheel, gearing operatively connecting said hand wheel and said winding means, said back plate having a solid upper portion and a skeletonized lower portion, the top portion of said front plate and the upper portion of said back plate enclosing said gearing, and a pair of lugs formed upon said front and back plates, said lugs forming means to directly support said winding means.

5. In a housing for a hand-brake, the combination of a back-plate comprising a substantially planar body portion of skeletonized contour, a rearwardly extending and relatively shallow peripheral flange formed on said back-plate, a bearing in the upper portion of said back-plate defined by a cylindrical recess having a closed bottom portion lying substantially in the plane of said peripheral flange, a bearing formed by an inwardly extending boss integral with said body portion in the lower part thereof, the upper and lower portions of said rear plate being provided with pairs of integrally formed angularly extending arms; a front plate formed with a rearwardly turned flange to coincide with said rear plate so as to define a closed chamber adjacent the upper portion of both plates, a bearing in said front plate axially aligned with the bearing in the upper portion of said back-plate, an inwardly turned boss thereon to provide a bearing coaxial with the bearing in the lower portion of said back-plate, and a plurality of angularly disposed arms formed integrally with said front plate and adapted to register with the beforementioned arms of said back-plate to provide a means of attachment thereto.

6. A housing for a hand-brake including a back-plate comprising a substantially planar body portion of skeletonized contour, a rearwardly extending and relatively shallow peripheral flange formed on said back-plate, a bearing in the upper portion of said back-plate defined by a rearwardly extending cylindrical recess having a closed bottom portion lying substantially in the plane of said peripheral flange, a second bearing formed by a forwardly extending cylindrical boss formed integrally with said body portion in the lower part thereof, a pair of integrally formed angularly extending arms on the upper portion of said plate, and a pair of integrally formed angularly extending arms on the lower portion thereof.

7. A support for a hand brake including a back plate comprising a substantially planar body portion, a rearwardly extending and relatively shallow flange formed on said back plate, a bearing in the upper portion of said back plate defined by a rearwardly extending cylindrical recess the bottom of which lies substantially in the plane of said flange, and a second bearing formed in the lower part of said plate by a forwardly extending cylindrical boss formed integrally with said body portion.

8. A support for a hand brake including a back plate comprising a substantially planar body portion, a rearwardly extending and relatively shallow flange formed on said back plate, a bearing in the upper portion of said back plate defined by a rearwardly extending cylindrical recess the bottom of which lies substantially in the plane of said flange, a second bearing formed in the lower part of said plate by a forwardly extending cylindrical boss formed integrally with said body portion, and means for lubricating said first-mentioned bearing comprising a duct formed on and extending rearwardly of said body portion and communicating from an external surface thereof with the bearing.

9. A support for a hand brake including a back plate comprising a substantially planar member having a narrow trunk portion extending downwardly from a wider head portion, and arms and legs extending from the upper and lower extremities of the trunk portion, said trunk portion having bearings integrally formed adjacent its upper and lower extremities.

10. A support for a hand brake including a back plate comprising a substantially planar member including a narrow trunk from the upper and lower extremities of which extend arms and legs, said trunk portion also including a plurality of integral bearings.

11. A support for a hand brake comprising in combination, a back plate including a substantially planar member having a trunk portion and a pair of arms and legs extending therefrom, said member also including a shallow reinforcing flange which borders and extends from the edges of said trunk portion and said arms and legs, a pair of bosses formed on said trunk portion and extending therefrom to form spaced bearings on said back plate of a thickness greater than that of the plate proper, a front plate formed with a rearwardly turned flange to coincide with said rear plate so as to define a chamber closed at the top and sides but open at the bottom, a bearing in the upper portion of said front plate axially aligned with one of the bearings in said back plate, an inwardly extending boss formed on said front plate nearer the bottom than the top thereof to provide a bearing coaxial with the other bearing on said back plate, and a plurality of angularly disposed lugs formed integrally with said front plate and adapted to register with the extremities of said arms and legs of said back plate to provide a means of attachment thereto.

RICHARD W. BURNETT.